Nov. 23, 1948.  R. A. FOULSTON  2,454,440
WIND ELECTRIC GOVERNOR
Filed Dec. 18, 1944
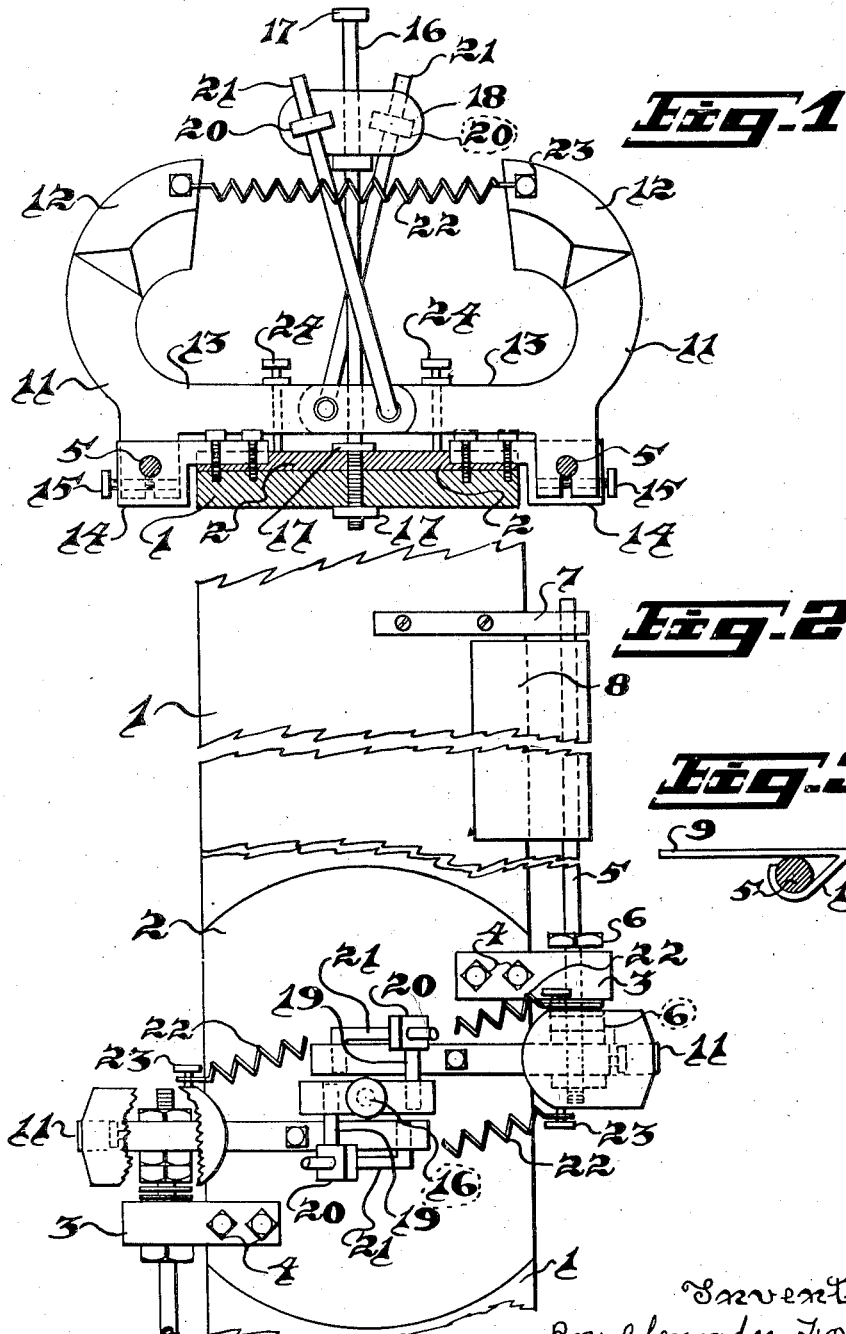
Inventor,
Roy Alexander Foulston
Per L. S. Mitchell
Attorney Patented Nov. 23, 1948

2,454,440

UNITED STATES PATENT OFFICE 2,454,440

WIND ELECTRIC GOVERNOR

Roy Alexander Foulston, Tugaske, Saskatchewan, Canada

Application December 18, 1944, Serial No. 568,693

3 Claims. (Cl. 170—68)

My invention relates to governors, having particular reference to a blade governor for wind electric machines by which variations in wind velocities may be accommodated and the voltage output maintained constant.

In wind electric machines it is necessary to control the operation of the blade to avoid adverse effects of extremes in wind velocities and to maintain a constant speed of travel of the blade with uniform voltage output. It is desirable in such governing mechanism to not only obtain a constant rate of travel of the blade irrespective of variations in wind velocities but also to maintain the necessary output in low winds.

The present invention contemplates improvements in governors for this purpose by which upon the blade attaining a predetermined speed the governor automatically operates to prevent increase in the rate of travel of the blade.

One of the objects of the invention is accordingly to provide an improved blade governor for wind electric machines including governor elements adapted to be affected by centrifugal force during travel of the blade and braking means for the blade actuated by the governor elements.

A further object of the invention is to provide improved braking means for the blade in the form of auxiliary leading edge sections mounted to be turned to vary the pressure of air currents impinging against the face of the blade.

A still further object of the invention is to provide improved governor means for control of the movable blade sections including spring means normally holding the governor elements inoperative to effect movement of the blade sections during travel of the blade below predetermined speeds with means for delicate adjustment of the governor elements.

A still further object of the invention is to provide stabilizing means for the governor elements in the form of shiftable counterweights ensuring stabilized operation of the governor.

To the above ends there is provided the novel arrangement of parts hereinafter more particularly described and claimed and in which other features and advantages of the invention will become apparent.

In the drawings like characters of reference indicate like parts throughout the different views in which:

Fig. 1 is a view in transverse section of a blade with my improved governor in attachment thereto, the governor elements being shown in normal position at rest.

Fig. 2 is a plan view of the blade with attached governor elements, certain parts being shown broken away for convenience of illustration.

Fig. 3 is an end view of an auxiliary blade section and including the control rod in section.

Having reference to the drawings there is provided a blade 1 for mounting on a shaft and including a boss 2 of aluminium.

The governor and auxiliary blade sections are in duplicate and for convenience of description like numerals are applied to corresponding duplicate parts.

On the boss 2 are mounted bearing plates 3, countersunk therein, secured by bolts 4. The plates 3 carry rods 5 mounted for rotation therein, the rods being held against endwise displacement by nuts or burrs 6—6 spaced by the plates 3.

The outer ends of rods 5 are supported rotatable in bearing straps 7 secured to the blade 1.

Mounted fixed on the rods 5 are auxiliary blade sections 8. See also Figure 3. The blade sections provide flat working faces 9 and integral clamping sections 10 embracing the rods 5 fixed to turn with said rods. These auxiliary blade sections are on the leading edges of the blade 1, there being of course duplicates, one for each leading edge.

The governor for control of the auxiliary blade sections provides governor elements 11 that include counterweight portions 12 and inwardly directed legs 13. On the under sides of the governor elements are integral lugs 14 shaped to engage the rods 5 and adapted to be clamped fixed thereto by transverse bolts 15.

In the center of the blade 1 is an upright rod or standard 16 mounted in a suitable opening through the blade 1 and boss 2 and secured by nuts 17 threaded thereon spaced by the blade and boss. The upper end of the rod 16 terminates in a head 17'.

On the rod 16 is a weighted slide 18 providing laterally projecting pins 19 with heads 20 loose on the pins and bored to receive rods 21 fixed thereto. The rods 21 are carried by the legs 13 of the counterweights, the rods 21 being bent at the lower ends to be inserted in suitable openings in said legs free to turn therein.

The slide 18 serves as a stabilizer for operation of the counterweights but this is secondary to parallel springs 22 connected to the opposing counterweights by studs 23. The springs 22 are tensioned to normally hold the counterweights at rest with the legs 13 seated against the boss 2 and in opposition to the effect of the centrifugal force resulting from rotation of the blade 1.

For adjustment of the normal seated position of the counterweights the legs 13 carry set screws 24 the ends of which bear against the boss 2. This permits adjustment of the normal position at rest of the auxiliary blade sections 8 in relation to the blade 1.

In the operation of the governor travel of the blade 1 up to a predetermined speed produces no operative result from the governor apparatus. This speed may be varied by adjustment of the set screws 24. An increase in the rate of travel of the blade 1, as by an increase in velocity of impinging air currents, through the action of centrifugal force, causes the governor elements to pivot outward to turn the rods 5. This occurs when the force acting on the counterweights overcomes the tension of springs 22. The turning of rods 5 turns the auxiliary blade sections 8 varying the pressure of impinging air currents by partially diverting the wind from the face of the blade 1 and correspondingly reduces the force with which the air currents act on the blade with resulting control of travel of the blade.

The action of the governor elements being opposed by springs 22 upon reduction of the wind velocity the springs are enabled to restore the auxiliary blade sections to a normal position.

The blade 1 is preferably constructed of abnormal width and less length than normal to obtain an increase in rate of travel of the blade and it has been found that this permits better control when subjected to excessive wind velocities.

For stabilizing the operation of the governor elements and springs the slide 18 is provided. As the legs 13 of the governor elements are moved by operation of the governor weights the slide 18 is caused to move on the rod 16 and this provides an effective stabilized balance in the operation of the governor producing a smooth evenly balanced operation of the device.

While I have herein described a preferred embodiment of my invention it is obvious that changes in construction and arrangement of parts and elements would be feasible and such changes would be considered as part of the present invention in so far as they come within the spirit and scope of the appended claims.

Having thus described my invention what I claim and wish to secure by Letters Patent is:

1. A governor for wind electric machine blades comprising rods mounted for rotation parallel with and in advance of the leading edges of the blades, auxiliary blade sections carried by the rods, governor elements fixed to the rods movable under impulse of centrifugal force during travel of the blade to turn the rods, spring means opposing movement of the governor elements, and a stabilizer for the governor elements comprising a rod extending outwardly from the blade, a weighted slide movable lengthwise of the rod, the governor elements including legs, and rods connecting said legs and slide for movement of the slide when the governor elements are caused to move under impulse from the blade sections.

2. A governor for wind electric machine blades comprising rods mounted for rotation parallel with and in advance of the leading edges of the blade, auxiliary blade sections carried by the rods, governor elements fixed to the rods, said elements each providing a weighted section and leg section, springs connecting the weighted sections of the governor elements opposing movement thereof under impulse of centrifugal force during travel of the blade, a rod extending outwardly from the blade, a weighted slide mounted on the rod, and means connecting the governor elements leg sections and slide for movement of the slide by movement of the governor elements.

3. In a governor for a wind electric machine, said machine providing a blade and said governor comprising opposing governor elements carried by the blade pivotally mounted, said elements including a weighted section and a leg section, springs connecting the governor elements opposing movement thereof under impulse of centrifugal force, and a stabilizer for the governor elements comprising a rod mounted extending outwardly from the blade, a weighted slide on the rod, and means connecting the leg sections of the governor elements and slide for actuation of the slide when the governor elements are caused to move.

ROY ALEXANDER FOULSTON.

REFERENCES CITED

The following references are of record in the file of this patent:

UNITED STATES PATENTS

| Number | Name | Date |
| --- | --- | --- |
| 1,287,116 | Schramm | Dec. 10, 1918 |
| 1,782,280 | Willenbring | Nov. 18, 1930 |
| 1,793,321 | Jacobs | Feb. 17, 1931 |
| 2,025,561 | Wilford | Dec. 24, 1935 |
| 2,139,954 | Hartley | Dec. 13, 1938 |
| 2,148,921 | Allen | Feb. 28, 1939 |
| 2,215,456 | Albers | Sept. 24, 1940 |
| 2,317,778 | Kuehn | Apr. 27, 1943 |